United States Patent Office 3,338,762
Patented Aug. 29, 1967

3,338,762
SOLID PROPELLANT COMPOSITION WITH BORON CONTAINING FUEL AND NITROGEN CONTAINING OXIDIZERS
Phyllis D. Oja, Walnut Creek, Calif., assignor to The Dow Chemical Company, Midland, Mich., a corporation of Delaware
No Drawing. Filed Jan. 24, 1962, Ser. No. 169,179
9 Claims. (Cl. 149—19)

This invention relates to new and novel solid rocket propellant systems and more particularly is concerned with novel solid rocket propellants based upon the "B–N" principle.

The "B–N" system, as disclosed in a copending application Ser. No. 846,509, filed Oct. 14, 1959, employs the concept of utilizing in a rocket engine the energy obtained by combustion of a boron fuel with a nitrogen oxidizing source material in forming solid boron nitride and generating hydrogen gas. Unusually high thrusts are achieved over that obtained in conventional carbon-hydrogen-oxygen systems since the undesirable high molecular weight gaseous exhaust products and compound dissociation at high temperatures which are inherent in such conventional systems virtually are eliminated in the "B–N" system.

Now, unexpectedly, it has been found that certain specific combinations of solid high nitrogen-containing materials and solid boron-based fuels can be utilized to provide solid rocket propellants which operate on the "B–N" concept and which exhibit desirably high specific impulses.

It is a principal object of the present invention therefore, to provide a new and novel solid rocket propellant system which, upon combustion in a rocket engine, exhibits high specific impulses.

It is another object of the present invention to provide a solid rocket propellant system which operates on the "B–N" concept.

It is a further object of the present invention to provide a solid rocket propellant system wherein a polymeric high nitrogen oxidizing source material serves as a binder for the solid boron fuel thereby markedly contributing to the energy obtainable from boron nitride formation during combustion of the propellant.

It is an additional object of the present invention to provide a rocket propellant system wherein the oxidizer and fuel are compatible and when in admixture provide a propellant which can be readily and safely stored without undesirable degradation for extended periods of time prior to use.

It is another object of the present invention to provide a solid rocket propellant the oxidizer and fuel components of which both are solid at ordinary temperatures.

These and other objects and advantages will be apparent from the detailed description presented hereinafter.

The instant propellant compositions comprise a solid boron containing fuel and a solid high nitrogen containing organic monomer or polymer as the oxidizing source material.

The solid boron hydrides (e.g. decaborane, aluminum borohydride, beryllium borohydride, dihydrazinium perhydrodecaborate and its hydrozine solvates, diammonia decaborane, ammonia triborohydride, ammonia nonaborane, dihydrazine pentaborane) and amorphous boron itself are especially suitable for use as fuels in the instant compositions.

Solid high nitrogen containing oxidizers which are preferred for use with the boron fuels, include, for example, triaminoguanidinium azide, diaminoguanidinium azide, monoaminoguanidium azide, monoaminoguanidine, diaminoguanidine, triaminoguanidine, aminotetrazole, diaminotetrazole, 4-amino-3,5-dihydrazino-1,2,4(4H)-triazole, dihydrazinotetrazine, and, mixtures and homo- and copolymers of these.

Particularly desirable nitrogen oxidizers to be employed are the high nitrogen containing polymers prepared by condensing one or a mixture of the hereinbefore listed amines with a formaldehyde or glyoxal based material as dislcosed in a copending application, Ser. No. 169,178, entitled "High Nitrogen Polymers," filed Jan. 24, 1962. These latter materials which have N/C atom ratios of from greater than 1 up to 4 or more and H/N ratios of from about 0.7 up to 1 or more are particularly useful since they are hard solids at room temperature but readily soften at temperatures ranging from about 30 up to about 100° C. Therefore, these high N/C ratio polymers in addition to providing the nitrogen oxidizers needed in the "B–N" system also serve as excellent binders for the solid propellant.

Other polymeric nitrogen oxidizing materials having high N/C ratios particularly adaptable for use in the instant composition are the poly(guanidines), poly(amino-substituted guanidines), poly(guanidinium azides) and poly(amino-substituted guanidinium azides) which conveniently can be prepared according to the process disclosed in a copending application, Ser. No. 169,176, filed Jan. 24, 1962, entitled "High Nitrogen Polymers and Process for Preparation Thereof."

With compositions of the hereinbefore listed fuels and oxidizers there is a large amount of hydrogen generated during combustion. This serves as a desirable low molecular weight driving fluid.

The ratio of boron fuel to nitrogen compound to be employed in the instant compositions ranges from about 0.85 to about 1.0 based on the stoichiometric quantities needed for boron nitride formation. Preferably, a slightly nitrogen rich composition based on the B–N contents of the fuel and oxidizer respectively as needed for boron nitride formation, will be employed.

The oxidizer and fuel can be formulated directly into a propellant grain, especially as indicated hereinbefore when using the thermoplastic high N/C ratio polymers. Additionally the high nitrogen monomers and solid boron fuel can be bound with these high N/C polymers. However, if desired, other binders, i.e. carbon-hydrogen compounds as used in conventional systems, can be employed with the nitrogen oxidizer and boron fuel in the fabrication of the grain. Desirably the amount of these carbon-hydrogen based compounds will be kept low in order to achieve optimum performance of the grain. Typical conventional binders which can be used include, for example, polyurethane, polyvinylchloride, polyethylene, polypropylene, nitrocellulose, polybutadiene acrylic acid copolymer etc.

The compositions can be made into solid propellant grains utilizing conventional formulation and fabrication techniques as are employed in the solid propellant art.

The following examples will serve to further illustrate the present invention but are not meant to limit it thereto.

EXAMPLE 1

A substantially stoichiometric mixture based on the boron and nitrogen contents of the fuel and oxidizer as calculated for boron nitride formation of triaminoguanidium azide (empirical formula $CH_9N_9$) and decaborane (empirical formula $B_{10}H_{14}$) were formulated into a solid propellant grain. The mixture burned violently upon ignition and had a calculated specific impulse of 289 seconds.

EXAMPLE 2

Thirteen moles of diammonia decaborane ($B_{10}H_{18}N_2$) and 8 moles of poly-triaminoguanidinium azide ($C_4H_{13}N_{13}$)

were fabricated into a propellant grain and fired in a small rocket motor. The propellant burned smoothly in this small scale test.

EXAMPLE 3

Nine moles of diammonia decaborane and 8 moles of triaminoguanidinium azide were blended and fired in a ballistic bomb. The pressure-time trace of the firing indicated smooth combustion of the propellant. Analysis of the combustion products indicated formation of boron nitride.

EXAMPLE 4

Nine moles of decaborane and 10 moles of triaminoguanidinium azide were formulated into a propellant composition and tested in a ballistic bomb. Smooth combustion was indicated from the pressure-time trace and boron nitride was indicated to be a combustion product.

EXAMPLE 5

Thirteen moles of tris-(hydrazino)perhydrodecaborate ($B_{10}H_{24}N_6$) and four moles of polytriaminoguanidinium azide were combined and ignited in a ballistic bomb. Smooth combustion was indicated and boron nitride formation shown.

In a manner similar to that described for the foregoing examples a polymer of triaminoguanidinium azide condensed with formaldehyde to produce a thermoplastic resin having a N/C atom ratio of about 3.5 or more can be formulated with a stoichiometric quantity of decaborane, based on formation of boron nitride, to provide a solid rocket propellant. Also, a condensation polymer of diaminoguanidine azide can be blended with about 85 percent by weight of the stoichiometric amount of amorphous boron to provide a solid propellant. Beryllium borohydride and 4-amino-3,5-dihydrazino-1, 2,4(4H)-triazole can be formulated into a solid rocket propellant. Dihydrazine pentaborane and dihydrazinotetrazine can be compounded into a solid propellant grain. Triaminoguanidine and ammonia nonaborane also can be blended into a propellant.

Various modifications can be made in the present invention without departing from the spirit or scope thereof for it is understood that I limit myself only as defined in the appended claims.

I claim:
1. A solid rocket propellant composition which comprises a solid boron containing fuel selected from the group consisting of solid boron hydrides, light metal borohydrides, ammonia borohydrides, hydrazine borohydrides and elemental boron and a solid nitrogen containing oxidizing source material said nitrogen containing material being a member selected from the group consisting of monoaminoguanidine, diaminoguanidine, triaminoguanidine, monoaminoguanidinium azide, diaminoguanidinium azide, triaminoguanidinium azide, 4-amino-3,5-dihydrazino-1,2,4(4H)-triazole, dihydrazinotetrazine, aminotetrazole and mixtures and polymers thereof.

2. The solid rocket propellant as defined in claim 1 wherein the ratio of boron to nitrogen in the system ranges from about 0.85 to about 1.0 of that stoichimetrically required for boron nitride formation.

3. The composition as defined in claim 2 wherein the boron fuel and nitrogen oxidizers are stoichiometrically balanced based on formation of boron nitride.

4. The composition as defined in claim 1 and containing up to about 25 percent on the weight of the boron and nitrogen containing members of a carbon-hydrogen based binder as used in conventional propellants.

5. The composition as defined in claim 1 wherein the oxidizing source material is a copolymer of the nitrogen containing oxidizing source material and a member selected from the group consisting of formaldehyde and glyoxal, said copolymer having a N/C ratio of from greater than 1 up to about 4 and a H/N ratio of from about 0.7 to about 1.

6. A solid rocket propellant comprising substantially stoichiometric quantities, based on the boron and nitrogen contents of the fuel and oxidizer as calculated for boron nitride formation, of triaminoguanidinium azide and decaborane.

7. A solid rocket propellant comprising substantially stoichiometric quantities, based on the boron and nitrogen contents of the fuel and oxidizer as calculated for boron nitride formation, of polytriaminoguanidinium azide and diammonia decaborane.

8. A solid rocket propellant comprising substantially stoichiometric quantities, based on the boron and nitrogen contents of the fuel and oxidizer as calculated for boron nitride formation, of triaminoguanidinium azide and diammonia decaborane.

9. A solid rocket propellant comprising substantially stoichiometric quantities, based on the boron and nitrogen contents of the fuel and oxidizer as calculated for boron nitride formation, of polytriaminoguanidinium azide and tris-(hydrazino)perhydrodecaborate.

References Cited
UNITED STATES PATENTS

| | | | |
|---|---|---|---|
| 2,970,898 | 2/1961 | Fox | 149—19 X |
| 3,006,743 | 10/1961 | Fox et al. | 149—22 X |
| 3,040,055 | 6/1962 | Fetter | 149—22 X |
| 3,140,582 | 7/1964 | Tyson | 149—22 X |
| 3,151,445 | 10/1964 | Bauman | 149—22 X |

BENJAMIN R. PADGETT, *Primary Examiner.*

LEON D. ROSDOL, *Examiner.*